United States Patent [19]

Belsan et al.

[11] Patent Number: 5,193,184
[45] Date of Patent: Mar. 9, 1993

[54] DELETED DATA FILE SPACE RELEASE SYSTEM FOR A DYNAMICALLY MAPPED VIRTUAL DATA STORAGE SUBSYSTEM

[75] Inventors: Jay S. Belsan, Nederland; George A. Rudeseal, Boulder; Charles A. Milligan, Golden; Mogens H. Pedersen, Longmont, all of Colo.; John F. Kitchen, Lindfield, Australia; Henry S. Ludlam, Longmont, Colo.

[73] Assignee: Storage Technology Corporation, Louisville, Colo.

[21] Appl. No.: 540,500

[22] Filed: Jun. 18, 1990

[51] Int. Cl.$^5$ .............................................. G06F 11/00
[52] U.S. Cl. .................................. 395/600; 395/400; 364/DIG. 1; 364/246; 364/246.1; 364/246.3; 364/256.3; 364/256.4; 364/282.1; 364/282.3
[58] Field of Search .............. 395/600, 400, 425; 364/200, 900, DIG. 1, DIG. 2

[56] References Cited

U.S. PATENT DOCUMENTS

| 3,761,881 | 9/1973 | Anderson et al. | 395/400 |
|---|---|---|---|
| 4,057,848 | 11/1977 | Hayashi | 395/400 |
| 4,155,119 | 5/1979 | De Ward et al. | 395/400 |
| 4,290,104 | 9/1981 | Holtey et al. | 395/400 |
| 4,467,421 | 8/1984 | White | 395/425 |
| 4,587,610 | 5/1986 | Rodman | 395/400 |
| 4,722,085 | 6/1988 | Flora et al. | 364/200 |
| 4,758,951 | 7/1988 | Sznyter | 395/400 |
| 4,774,659 | 9/1988 | Smith et al. | 395/400 |
| 4,833,604 | 5/1989 | Cheng et al. | 395/425 |
| 4,853,842 | 8/1989 | Thatte et al. | 395/425 |
| 4,939,598 | 7/1990 | Kulakowski et al. | 360/48 |
| 4,942,486 | 7/1990 | Kutavagi et al. | 360/48 |
| 4,953,122 | 8/1990 | Williams | 395/400 |
| 4,974,197 | 11/1990 | Blount et al. | 395/250 |
| 4,989,206 | 1/1991 | Dunphy, Jr. et al. | 371/10.1 |
| 5,053,948 | 10/1991 | DeClute et al. | 395/600 |
| 5,075,845 | 12/1991 | Lai et al. | 395/425 |
| 5,124,987 | 6/1992 | Milligan et al. | 371/10.1 |

Primary Examiner—Allen R. MacDonald
Assistant Examiner—Ayaz R. Sheikh
Attorney, Agent, or Firm—Duft, Graziano & Forest

[57] ABSTRACT

The deleted dataset space release system provides facilities in a dynamically mapped virtual memory data storage subsystem to immediately release the physical space occupied by a deleted dataset for use by the data storage subsystem to store subsequently received data files. This system also provides data security by preventing the unauthorized access to the data of scratched data files, both in cache memory and on the data storage devices. The deleted dataset space release system utilizes a user exit in the host processor data file scratch routine to transmit information to the data storage subsystem indicative of the host processor data file scratch activity. Existing channel command words are used in a manner that is transparent to the host processor. The data storage subsystem thereby immediately receives an indication that the host processor is scratching a data file from the volume table of contents of a virtual volume. The data storage subsystem can then concurrently scratch this data file from the virtual track directory contained in the data storage subsystem and thereby release the physical storage space occupied by this scratched data file.

19 Claims, 12 Drawing Sheets

| CHANNEL COMMAND WORD | OP CODE | PARAMETERS | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| DEFINE EXTENT (1301) | 63 | 98 | E4 | 00 | 00 | 00 | 00 | 00 | XX | XX | XX | XX | YY | YY | YY | YY |
| LOCATE RECORD (1302) | 47 | 01 | 00 | 00 | 01 | 22 | 22 | 22 | 22 | C5 | C3 | C1 | D4 | 02 | 00 | FF |
| WRITE DATA (1303) | 05 | — | — | — | — | — | — | — | — | — | — | — | — | — | — | — |
| READ COUNT KEY DATA (1304) | 1E | IDENTIFY BEGINNING AND ENDING CCHH AND SEEK ADDRESS |

FIG. 13.

DELETED DATA FILE SPACE RELEASE SYSTEM FOR A DYNAMICALLY MAPPED VIRTUAL DATA STORAGE SUBSYSTEM

CROSS REFERENCE TO RELATED APPLICATIONS

This patent application is related to application Ser. No. 07/509,484 entitled Logical Track Write Scheduling System for a Parallel Disk Drive Array Storage Subsystem, filed Apr. 16, 1990.

FIELD OF THE INVENTION

This invention relates to a dynamically mapped data storage subsystem and, in particular, to apparatus for releasing the physical space occupied by a data file that is scratched by the host processor. The invention further relates to an improved arrangement for preventing the unauthorized access to data stored in the data storage subsystem after the file name for the data has been erased from a memory that lists the names of the files stored in the data storage subsystem.

PROBLEM

It is a problem in data storage subsystems to utilize the maximum amount of physical storage space in the data storage subsystem. There are numerous data file space management systems in use to accomplish this function and these systems are adapted to the particular operating system environment of the host processor. For example, in a typical IBM Xdirect access storage device (DASD) disk memory system, a data file is written into a selected memory location identified by a beginning cylinder number and head number (CCHH). The file name of the data file and its memory location (CCHH) are written into a volume table of contents (VTOC) on the volume in which the data file is stored. The virtual address of the data file is also written into an index memory associated with a disk control unit (DCU) associated with the DASD system. This memory functions as an index that lists the name and virtual address of the VTOC entry of each data file stored on the physical disk drive comprising the virtual volume.

A selected data file is read or written when the host processor reads the index memory associated with the disk control unit to determine the virtual address of the VTOC entry of the selected data file. The host processor transmits a command via the disk control unit to the disk drive containing the selected data file to interrogate the VTOC of the disk drive to identify the memory location (CCHH) that contains the selected data file. The host processor then transmits a command via the disk control unit to access the designated memory location (CCHH) of this disk drive to read or write the selected data file. When the selected data file is no longer desired, the host processor "scratches" the data file from the DASD system. In most cases the data file scratch operation merely involves the deletion of the data file name from the index memory associated with the disk control unit and from the VTOC of the disk drive volume storing the data file. The data file itself still remains in the virtual image and on the magnetic medium of the disk drive until it is overwritten or otherwise erased by the host processor.

A significant problem with this architecture is that data files are typically assigned to contiguous virtual tracks on a virtual volume. As these virtual tracks are allocated to a data file and data is written on these allocated virtual tracks, the virtual volume is progressively filled with data. When an allocated data file is scratched by the host processor, the space originally allocated to the scratched data file by the host processor may not be available for use by subsequently allocated data files. This is because the amount of space on the virtual tracks allocated to the scratched data file may be insufficient to store subsequently allocated larger data files. This causes fragmentation of the virtual volume where a significant amount of physical storage capacity of the DASD system is not allocated to any data file because this unused storage capacity is in the form of a plurality of small extents that are not of sufficient size to be readily useable by the host processor.

A method of avoiding this problem of conventional DASD systems is the use of a dynamically mapped virtual memory data storage subsystem which maps the virtual tracks of a virtual volume into logical tracks of a logical volume within the data storage subsystem. This enables the data storage subsystem to dynamically assign the physical storage space necessary to store the received data file independent of the limitations of a traditional DASD system, where the virtual tracks that comprise a virtual volume are defined by a fixed physical mapping onto physical tracks. A difficulty with the use of a dynamically mapped virtual memory data storage subsystem is that the data storage subsystem is unaware of the host processor activity in scratching obsolete data files unless the host processor is reprogrammed to actively erase data files from the data storage subsystem. In addition, the host processor is unaware of the data storage subsystem activity in dynamically mapping the virtual tracks of a virtual volume to selected logical tracks of a logical volume. Therefore, when data files are scratched by the host processor it is difficult to remove the scratched data files from the data storage subsystem in a timely manner and the data storage subsystem continues to perpetually maintain these obsolete files until the host processor overwrites these data files. If the data storage subsystem operates independent of the host processor, the host processor does not transmit deleted data file notifications to the data storage subsystem and the deleted data files are never physically removed therefrom.

A further problem with the above described DASD systems is that the tracks of a scratched data file remain accessible in the data storage subsystem by the use of a command requesting that a specified track of a specified physical device be read. By this means, the contents of the specified track can be read and made available to a user of the host processor. The only way to prevent access to the scratched data file stored on the specified track is to cause the host processor to perform an erase operation on the track containing the scratched data file to obliterate the data contained therein. While this is possible, it is burdensome and requires the use of substantial computer processor and storage subsystem resource utilization. As a result, separate data erase operations are customarily performed only for data files containing highly sensitive data such as payroll and the like, where the prevention of unauthorized access is worth the expenditure of required computer system processing time.

In the same manner as in a conventional DASD storage system using large form factor disk drives, a data file scratch operation can be performed in a dynamically mapped virtual memory data storage subsystem by deleting the name of the data file from the VTOC of the virtual volume containing the file. The erasure of the data file name from the VTOC precludes further access to the data file by a command that requires the data file name. However, in a manner similar to that of DASD systems using large form factor disk drives, a system user can employ commands which request the reading of the entirety of a specified virtual track. In response to the reception of such a command, the data storage subsystem applies the virtual address it receives to its virtual track directory to identify the logical address of the specified virtual track. The data storage subsystem then reads all data from the logical track that contains the contents of the specified virtual track. It can therefore be seen that the prevention of unauthorized access to data of scratched data files is a problem in dynamically mapped virtual memory data storage subsystems in the same manner as it is in conventional DASD subsystems.

It can be seen that traditional DASD data storage subsystems do not efficiently utilize the physical storage capacity of the magnetic media due to the virtual fragmentation eased by scratched data files. Furthermore, the typical dynamically mapped virtual memory data storage subsystem does not receive information from the host processor to identify data files that are scratched by the host processor in a timely manner and continues to maintain these obsolete data files. This again causes a loss of physical storage capacity on the data storage subsystem. In addition, it is a problem in all data storage subsystems to prevent the unauthorized access to the data of "scratched" data files where the scratch operation only involves the erasure of the data file name from the index memory associated with the disk control unit and from the VTOC of the disk drive volume containing the data file.

SOLUTION

The foregoing problems are solved and a technical advance achieved in the art by the deleted dataset space release system which provides facilities in a dynamically mapped virtual memory data storage subsystem to immediately release the physical space occupied by a deleted dataset for use by the data storage subsystem to store subsequently received data files. This system also provides data security by preventing the unauthorized access to the data of scratched data files.

The data storage subsystem consists of a parallel disk drive array that uses a large plurality of small form factor disk drives to emulate the format and capability of large form factor disk drives. The plurality of disk drives in the data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one of each of N physical tracks per logical track, and to store M redundancy segments, one on each of M physical track per logical track in the redundancy group. This data storage subsystem maintains a dynamic mapping between the virtual and physical data storage devices. The data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. A virtual track directory is maintained in the data storage subsystem to recall the location of the present instance of each virtual track in the data storage subsystem. The virtual track directory consists of an entry for each virtual track which the associated host processor can address. The entry contains the logical sector address at which the virtual track instance begins. The virtual track directory entry also contains data indicative of the length of the virtual track instance in sectors.

The deleted dataset space release system utilizes a user exit in the host processor data file scratch routine to transmit information to the data storage subsystem indicative of the host processor data file scratch activity. Existing channel command words are used in a manner that is transparent to the host processor. The data storage subsystem thereby immediately receives an indication that the host processor is scratching a data file from the volume table of contents. The data storage subsystem can then concurrently scratch this data file from the virtual track directory contained in the data storage subsystem and thereby release the physical disk space occupied by this scratched data file. Since the data file space release process is implemented in the data storage subsystem in conjunction with the host-processor-controlled volume table of contents scratch activity, the host processor prevents other processes within the host processor and other host processors from attempting to access this data file during the data file scratch procedure. Thus, the dynamically mapped virtual memory data storage subsystem immediately releases the physical space occupied by a scratched data file for use by subsequently received data files thereby maximizing the amount of physical storage capacity available to the host processor to provide a significant capacity and performance improvement over the standard large form factor disk drives.

In addition, by operating the data storage subsystem so that, in response to the reception of a data file scratch command, the logical address of the data file is erased from the virtual track directory, the erasure of the logical address information from the virtual track directory precludes the host processor from obtaining any further access to the scratched data file even though it still remains stored on the logical disk drives. After the erasure of the logical address from the virtual track directory, the data storage subsystem still responds to the reception of a command containing the virtual address for the data file by applying the virtual address to the virtual track directory to derive the corresponding logical address. However, since the logical address for the data file has been erased from the virtual track directory, the host processor receives only a null indication from the data storage subsystem, which appears as an erased track to the host processor. Thus, the data file remains secure and its unauthorized access is prevented even though the data for the data file remains on the magnetic media of the logical tracks of the logical memory into which it was written. The data remains secure since a user cannot generate a system command that could cause a logical track of a logical device to be read when the address of the logical track no longer remains in the virtual track directory.

Thus, it can be seen that the present invention solves the above-discussed prior art problems by enabling a dynamically mapped virtual memory data storage subsystem to immediately release the space occupied by a deleted data file and to preclude access to a data file remaining in the logical memory devices subsequent to the time that the virtual-logical address correlation information for the data file is removed from the virtual track directory of the data storage subsystem.

DESCRIPTION OF THE DRAWINGS

FIG. 13 illustrates details of typical channel program commands and parameters.

DETAILED DESCRIPTION

Data Storage Subsystem Architecture

Figure 1:
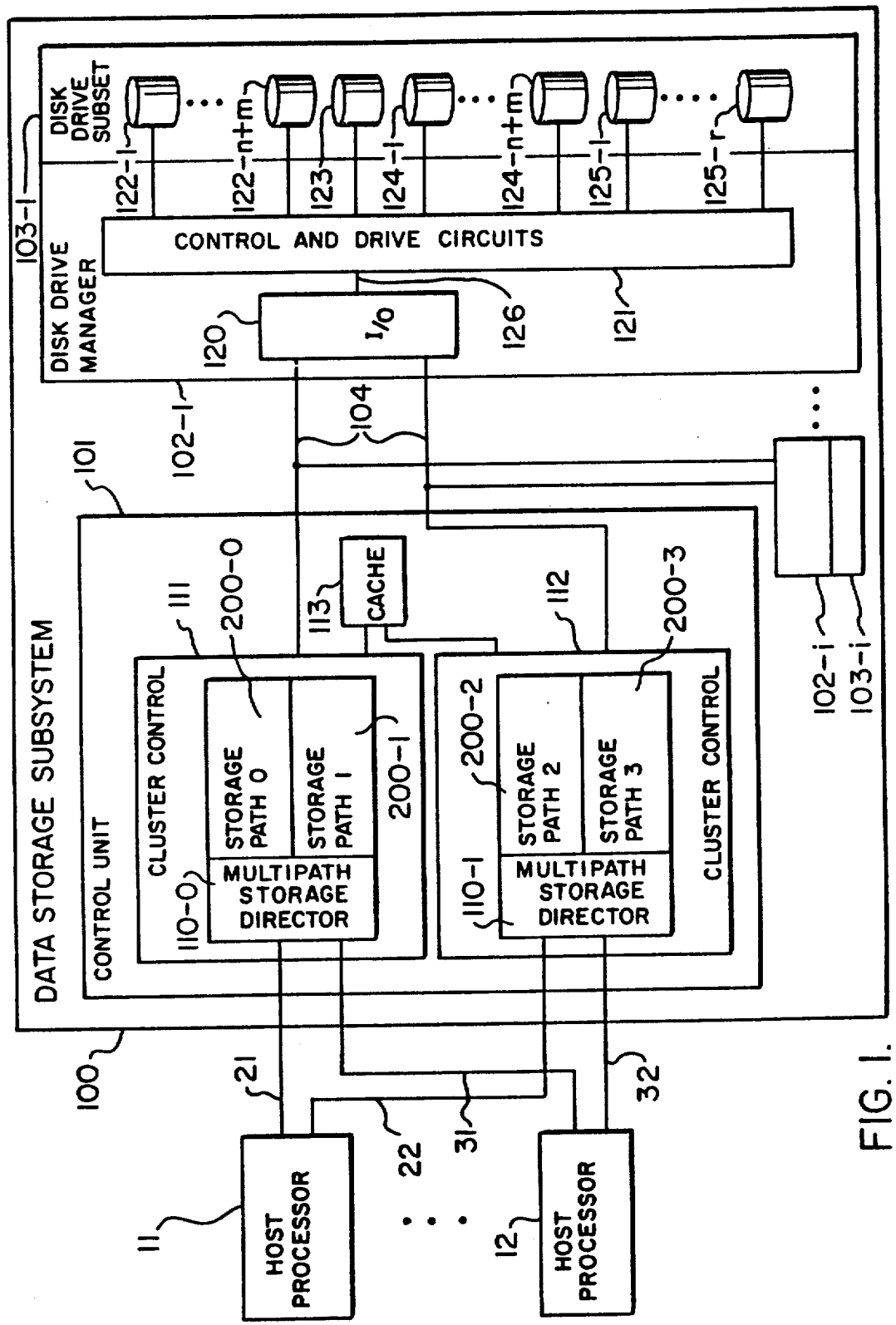
FIG. 1 illustrates the dynamically mapped virtual memory data storage subsystem in block diagram form.

FIG. 1 illustrates in block diagram form the architecture of the preferred embodiment of the dynamically mapped virtual memory data storage subsystem 100. The data storage subsystem 100 appears to the associated host processors 11-12 to be a collection of large form factor disk drives with their associated storage control, since the parallel disk drive array architecture of data storage subsystem 100 is transparent to the associated host processors 11-12. This data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel ex-21 from any host processor ex-11 to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101.

The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group.

An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (ex—an IBM 3380K type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive subset 103-1 can be considered a disk subsystem that consists of a disk drive mechanism and its surrounding control and interface circuitry. The disk drive consists of a commodity disk drive which is a commercially available hard disk drive of the type that typically is used in personal computers. A computer processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an ESDI interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 2:
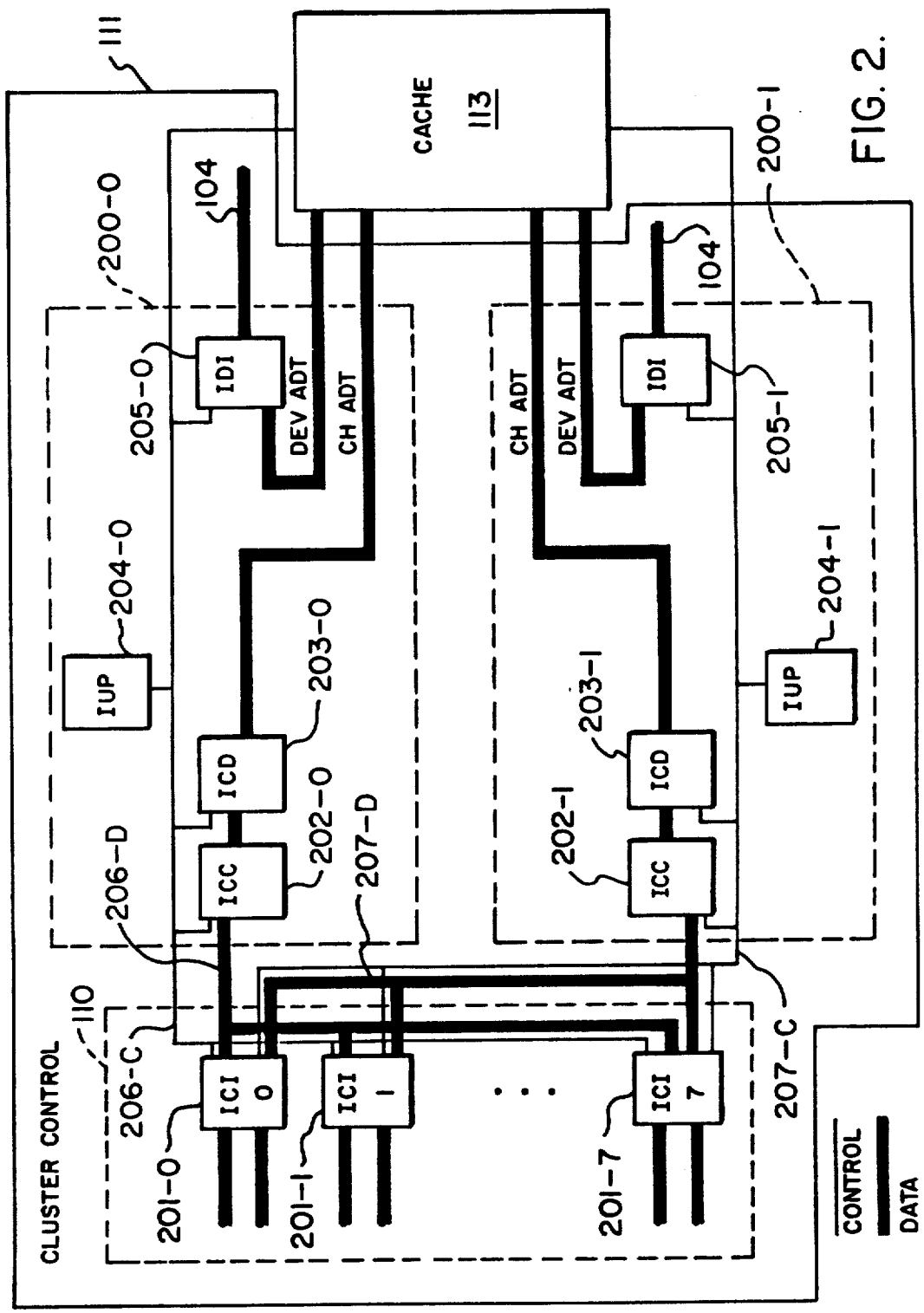
FIG. 2 illustrates additional detail of the cluster control.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

The parallel disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (ex 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the parallel disk drive array data subsystem 100 transparent to the host processors (11-12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A parallel disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the parallel disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the parallel disk drive array data storage subsystem 100 in order to create entirely free logical cylinders. In order to evenly distribute data transfer activity, the tracks of each virtual device are scattered as uniformly as possible among the logical devices in the parallel disk drive array data storage subsystem 100. In addition, virtual track instances are padded out if necessary to fit into an integral number of physical device sectors. This is to insure that each virtual track instance starts on a sector boundary of the physical device.

Mapping Tables

It is necessary to accurately record the location of all data within the parallel disk drive array data storage subsystem 100 since the data received from the host processors 11-12 is mapped from its address in the virtual space to a physical location in the subsystem in a dynamic fashion. A mapping table including a virtual track directory is maintained to recall the location of the current instance of each virtual track in the parallel disk drive array data storage subsystem 100. The virtual track directory consists of an entry for each virtual track which the associated host processor 11 can address. The entry contains the logical sector address at which the virtual track instance begins. The virtual track directory entry also contains data indicative of the length of the virtual track instance in sectors. The virtual track directory is stored in noncontiguous pieces of the cache memory 113 and is addressed indirectly through pointers in a virtual device table. The virtual track directory is updated whenever a new virtual track instance is written to the disk drives.

The storage control also includes a free space directory (FIG. 9) which is a list of all of the logical cylinders in the parallel disk drive array data storage subsystem 100 ordered by logical device. Each logical device is cataloged in a list called a free space list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. The collection of free space is a background process that is implemented in the parallel disk drive array data storage subsystem 100. The free space collection process makes use of the logical cylinder directory, which is a list contained in the first sector of each logical cylinder indicative of the contents of that logical cylinder. The logical cylinder directory contains an entry for each virtual Track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Free Space Collection

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to completely empty logical cylinders for destaging, the valid data in partially valid cylinders must be read into cache memory 113 and rewritten into new previously emptied logical cylinders. This process is called free space collection. The immediate release for scratched data files enhances the performance of the free space collection process since scratched data files are not collected into new logical cylinders. Therefore, it is obvious that a timely release of scratched data records is an important process in this data storage subsystem since it reduces the free space collection overhead in the subsystem.

Figure 9:
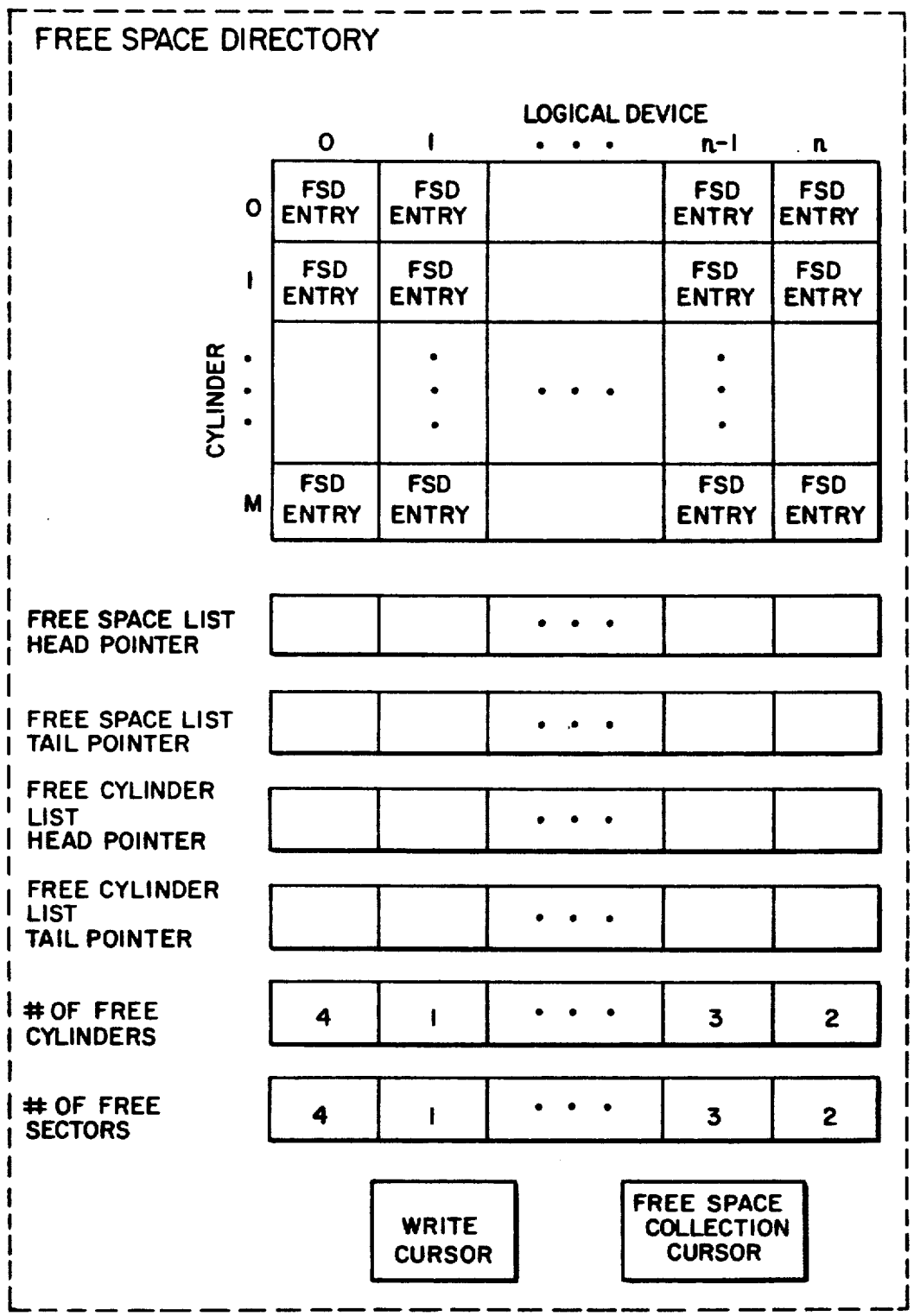
FIG. 9 illustrates a typical free space directory used in the data storage subsystem.

The free space collection function is accomplished by control unit 101. Control unit 101 selects a logical cylinder that needs to be collected as a function of how much free space it contains. The free space determination is based on the free space directory as illustrated in FIG. 9, which indicates the availability of unused memory in data storage subsystem 100. The table illustrated in FIG. 9 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated host processor 11-12 or as part of a free space collection process. In addition, a free space collection cursor is maintained which points to the present logical cylinder that is being cleared as part of a free space collection process. Therefore, control unit 101 can review the free space directory illustrated in FIG. 9 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty, since all of the virtual track instances therein are tagged as obsolete. Additional logical cylinders are collected for free space collection purposes or as data is received from an associated host processor 11-12 until a complete logical cylinder has been filled. Once a complete logical cylinder has been filled, a new previously emptied logical cylinder is chosen.

Figure 10:
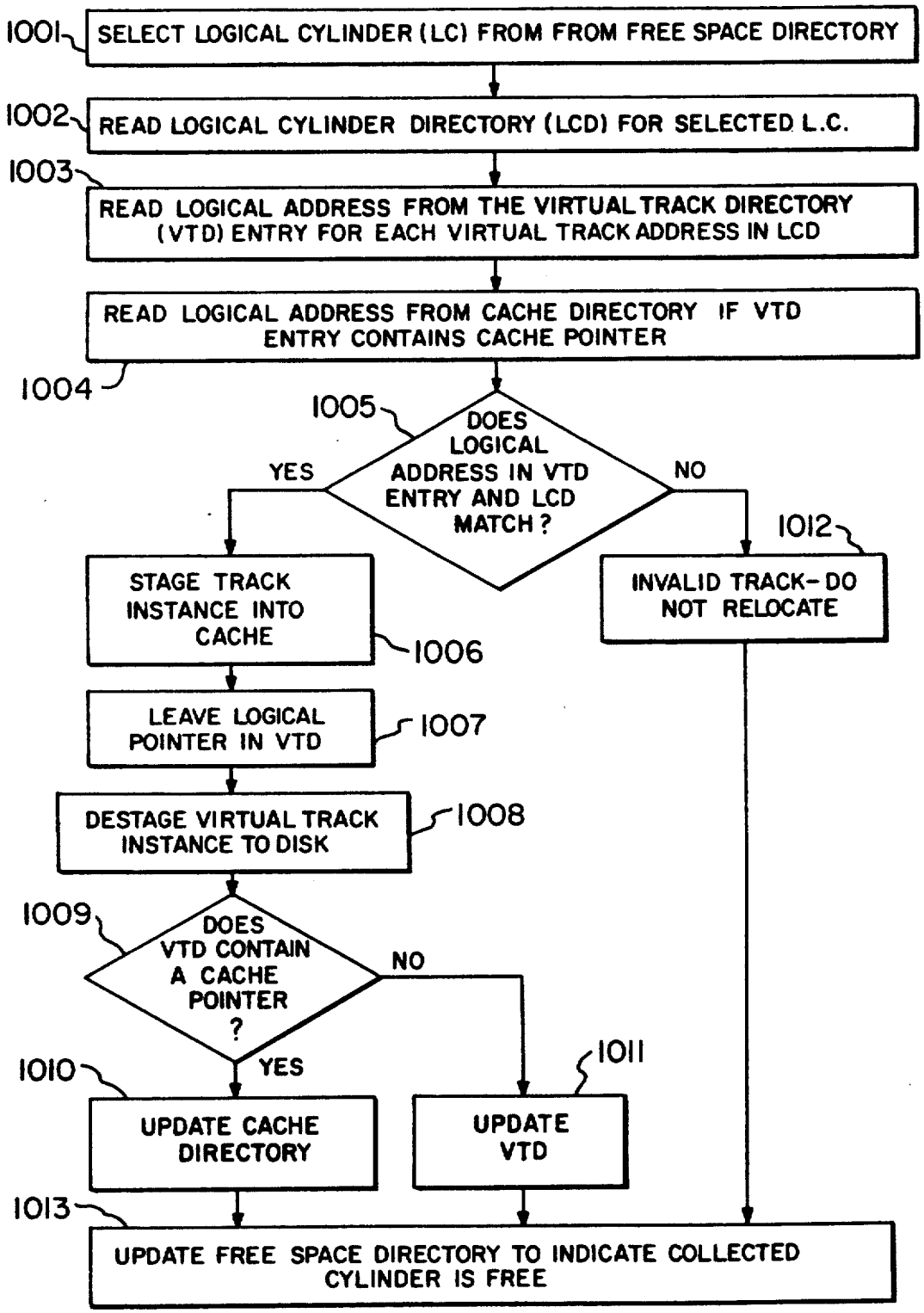
FIG. 10 illustrates, in flow diagram form, the free space collection process.

FIG. 10 illustrates in flow diagram form the operational steps taken by processor 204 to implement the free space collection process. The basic process is initiated at step 1001 when processor 204 selects a Logical Cylinder (LC) for collection based on the number of free logical sectors as listed in the Free Space Directory table of FIG. 9.

At step 1002, processor 204 reads the logical cylinder directory for the logical cylinder that was selected at step 1001. Processor 204 then at step 1003 reads the logical address from the virtual track directory (VTD) entry for each virtual track address that is contained in the read logical cylinder directory. At step 1004, if the VTD entry contains a cache pointer, the logical address is read from cache directory where it was relocated during the staging process. At step 1005, processor 204 compares the logical address that was stored in the virtual track directory entry with the logical address that was stored in the logical cylinder directory. If these two addresses do not match, that the indicates track instance is not valid and at step 1112, processor determines that the track instance is not valid, does not relocate this track instance and exits to step 1113.

If, at step 1005, processor 204 determines that the virtual address stored in the virtual track descriptor matches the virtual address stored in the logical cylinder directory, at step 1006 the virtual track instance is staged into predetermined location and cache memory 113. At step 1007, processor 204 leaves the logical pointer in the virtual track descriptor and destages the virtual track instance to the disk drive subset 103 that contains the logical cylinder used by this free space collection process at step 1008. At step 1009, processor 204 determines whether the virtual track descriptor contains a cache pointer. If it does not, at step 1011, processor 204 updates the virtual track descriptor and exits at step 1013. If the virtual track descriptor does contain a cache pointer, at step 1010, processor 204 updates the cache directory and exits to step 1013. At step 1013, processor 204 updates the free space directory to indicate that the collected cylinder is now a free cylinder available for data storage purposes and the data previously contained therein has been selected to a designated logical cylinder and the appropriate mapping table entries have been updated.

Memory Mapping

Figure 3:
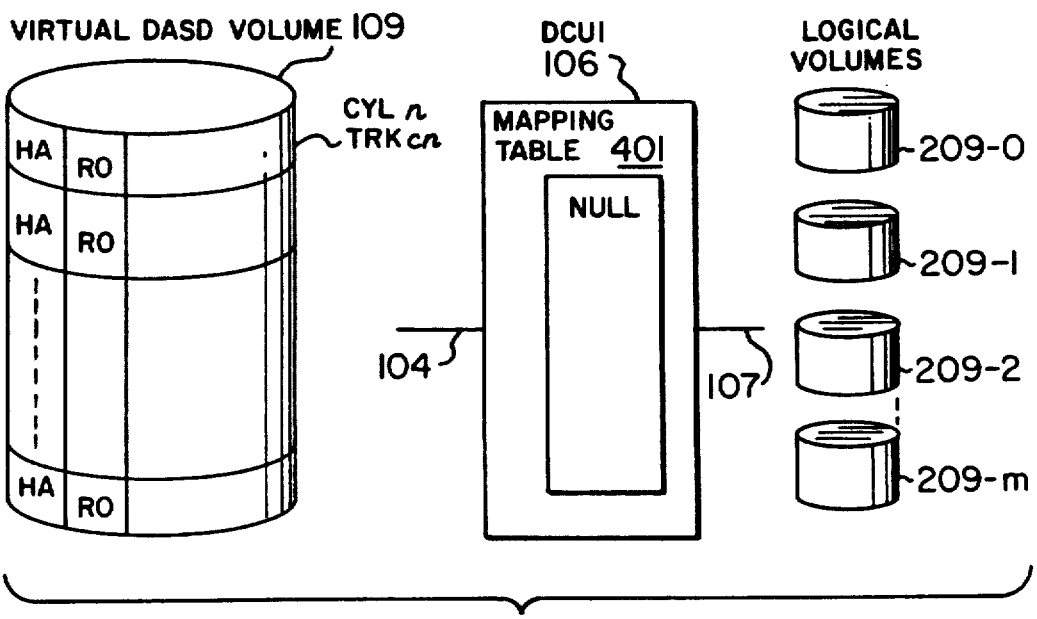
FIG. 3 illustrates the virtual image of a traditional unformatted DASD volume, the corresponding mapping tables and the physical DASD elements in a mapped logical subsystem.

FIG. 3 shows several conceptual elements contained in the dynamically mapped virtual memory data storage subsystem 100 relevant to the scratched data file space release process. On the left of FIG. 3 is shown an image of a virtual DASD volume emulated by data storage subsystem 100. FIG. 3 also shows control unit 101 having a mapping table 401 (contained in cache 113). FIG. 3 further shows a plurality of logical volumes 209-0 through 209-m corresponding to redundancy groups (122-1 to 122-n+m, 124-1 to 124-n+m) of FIG. 1 The idiosyncrasies of the logical devices 209 are invisible to host processor 11 which assumes it is connected to a physical DASD device and operates only with the virtual addresses used by virtual DASD volume 109. Control unit 101 translates virtual addresses into the logical addresses used by devices 209.

FIG. 3 shows the unformatted state of the emulated virtual DASD volume 109 with which host processor 11 believes it communicates in the writing and reading of data. The system state represented by FIG. 3 portrays the condition in which virtual DASD volume 109 exists prior to the time that any data or information is written on the virtual volume. In this state, each track of the virtual volume contains only a home address and a record 0 (HA, R0) field as is well known in the art. The logical volumes 209-0 through 209-m are devoid of information at this time.

Figure 4:
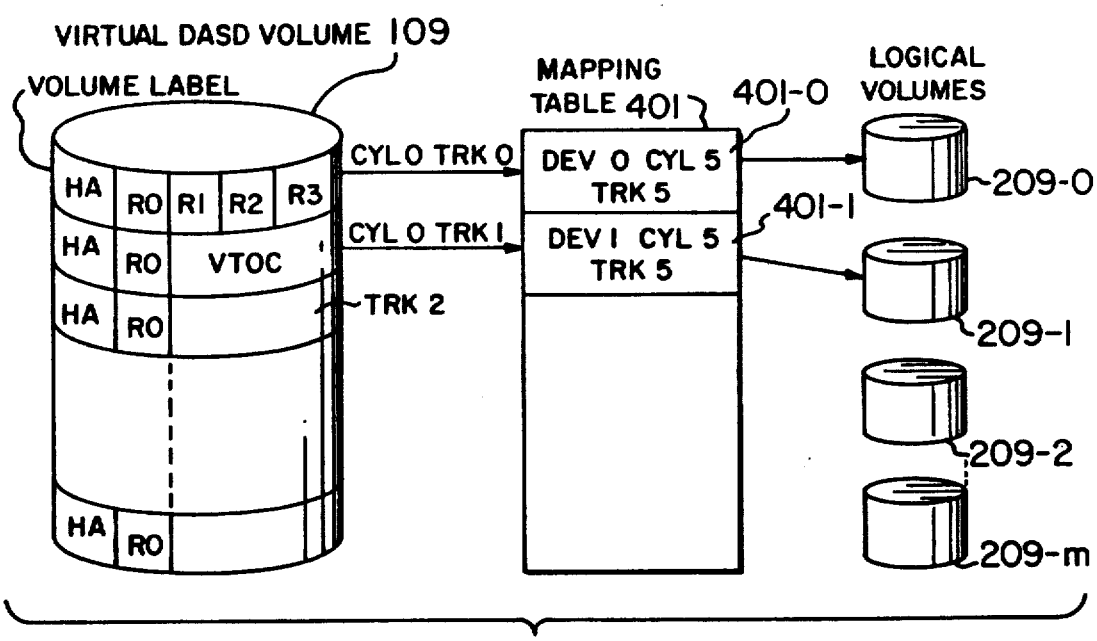
FIG. 4 illustrates the first and second tracks written to the virtual volume, the corresponding mapping table entries and the physical DASD elements in the mapped logical subsystem.

FIG. 4 shows the next step in the typical process of preparing a virtual DASD volume 109 and the logical volumes 209 for the storage of data. Track TRK0 of cylinder 0 of virtual DASD volume 109 contains the same HA and R0 fields as does the virtual DASD volume 109 of FIG. 3. In addition, virtual DASD volume 109 of FIG. 4 now contains the R1, R2 and R3 fields in cylinder 0 track TRK0. These fields comprise the volume label, which is well known in the art and which contains various overhead information for the virtual volume. This volume label information includes record R3 which contains information pertaining to the VTOC which is shown as being contained in track 1 of cylinder 0, although the VTOC may be stored anywhere on virtual volume 109 other than in track TRK0. The only thing that need be understood is that the VTOC dataset may be located anywhere on virtual volume 109 other than in track TRK0 and that the R3 record of the volume label contains information regarding the whereabouts of the VTOC dataset on the volume.

Since the logical volumes 209 must store the same information as would be contained in the emulated virtual volume 109, the volume label information is recorded in, for example, cylinder 0 track 0 of logical device 209-0 shown on the right on FIG. 4. The logical address of the volume label information is written into location 401-0 of the mapping table 401 which is an addressable memory and is stored in cache 113. Mapping table memory 401 translates between the virtual volume address and the corresponding logical volume address for each virtual track. This enables the logical DASD system to receive a command from host processor 11 specifying the virtual memory address of a data file and execute the read or write operation requested by host processor 11. In response to the receipt of such a command, control unit 101 applies the received virtual address information to mapping table 401 to determine the corresponding logical address.

When host processor 11 issues a command to write the volume label information on virtual volume 109, control unit 101 writes data in field 401-0 indicating the location of the volume label information for virtual volume 109 in the logical volumes 209. As shown on FIG. 4, control unit 101 determines that the volume label information of virtual volume 109 is to be entered into cylinder 0 track 0 of logical volume 209-0. The address translation information for the virtual VTOC is written into location 401-1 of mapping table 401 which shows that the virtual VTOC is in CLY5 TRK5 of device 209-1. The VTOC is described in greater detail in connection with FIG. 5.

VTOC Dataset

Figure 5:
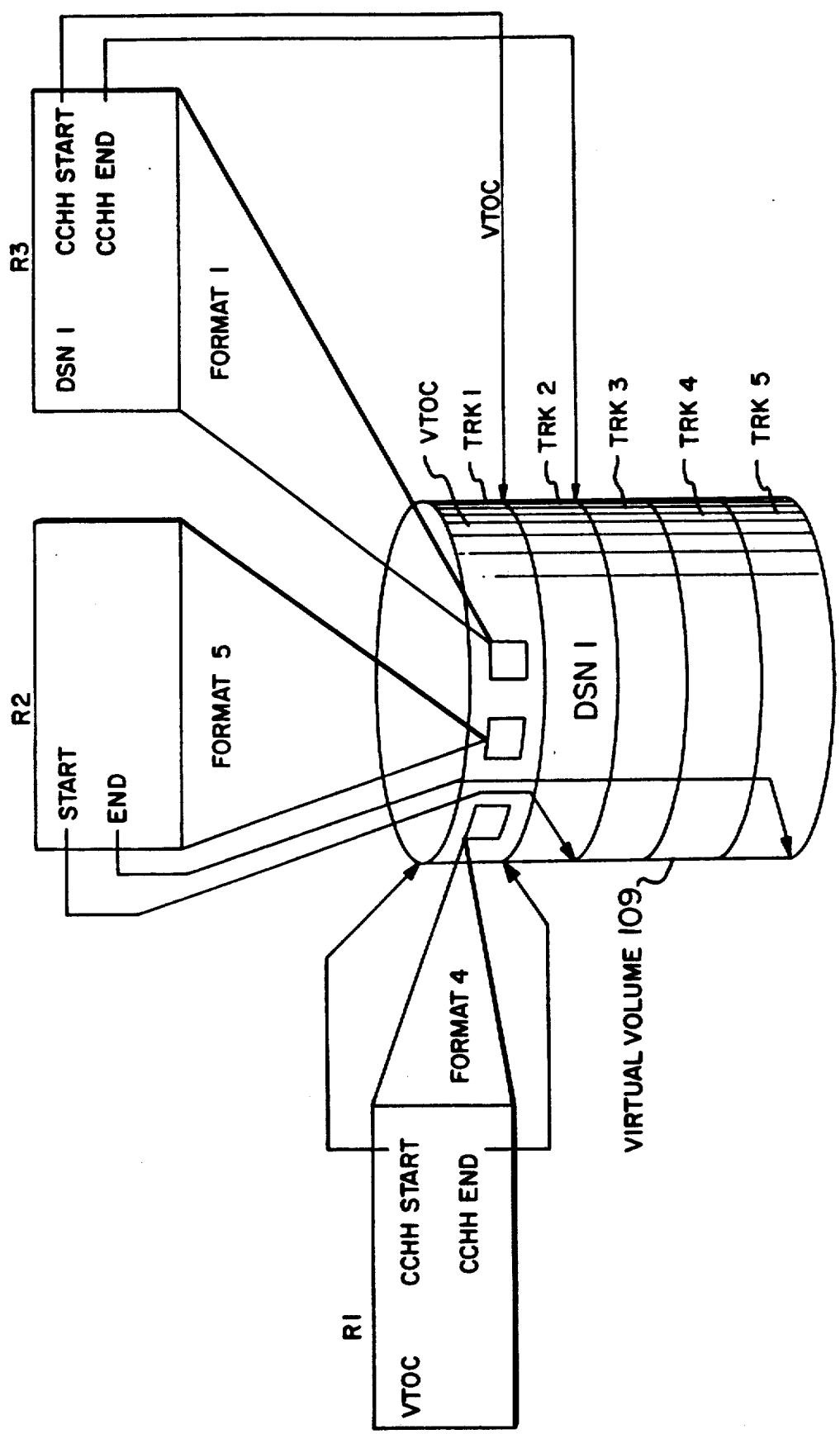
FIG. 5 discloses further details of a VTOC.

FIG. 5 shows further details of the VTOC dataset of virtual volume 109. The VTOC dataset is shown as being contained in track TRK1 of virtual volume 109. The volume label information may be assumed to be in track TRK0 of the virtual volume 109, as on FIG. 4, even though it is not shown on FIG. 5. The VTOC dataset of FIG. 5 contains three records designated R1, R2, and R3. Record R1 is of the format 4 type and, as is well known in the art, describes the extent and contents of the VTOC and provides volume and device characteristics. There is one format 4 entry on each virtual volume and the virtual address of this R1 record is found in the R3 record of the volume label. The R1 record entry of the VTOC also indicates the cylinder and head number (CCHH) information specifying the start and end of the VTOC dataset.

Record R2 of the VTOC dataset is of the format 5 type and contains free space information for the virtual volume. For a non-indexed VTOC, this record describes the memory space on virtual volume 109 that has not been allocated to a data file. There may be a plurality of format 5 entries and the first such format 5 entry on the volume (VTOC) is always the second data set control block (DSCB) of the VTOC.

The virtual volume 109 of FIG. 5 is also shown to have been recorded with a first data file, designated DSN1, in track TRK2. Tracks TRK3 through TRK5 and higher are still empty. Information pertaining to data file DSN1 is stored in VTOC record R3 which is of the format 1 type. This R3 record describes the first three extents of the data file and there is one R3 record entry for each data file on the volume except for the VTOC itself. The R3 record contains information specifying the cylinder number and head number for both the beginning and end of data file DSN1. A R3 record is of the format 0 type when a data file is not recorded in that record.

Figure 6:
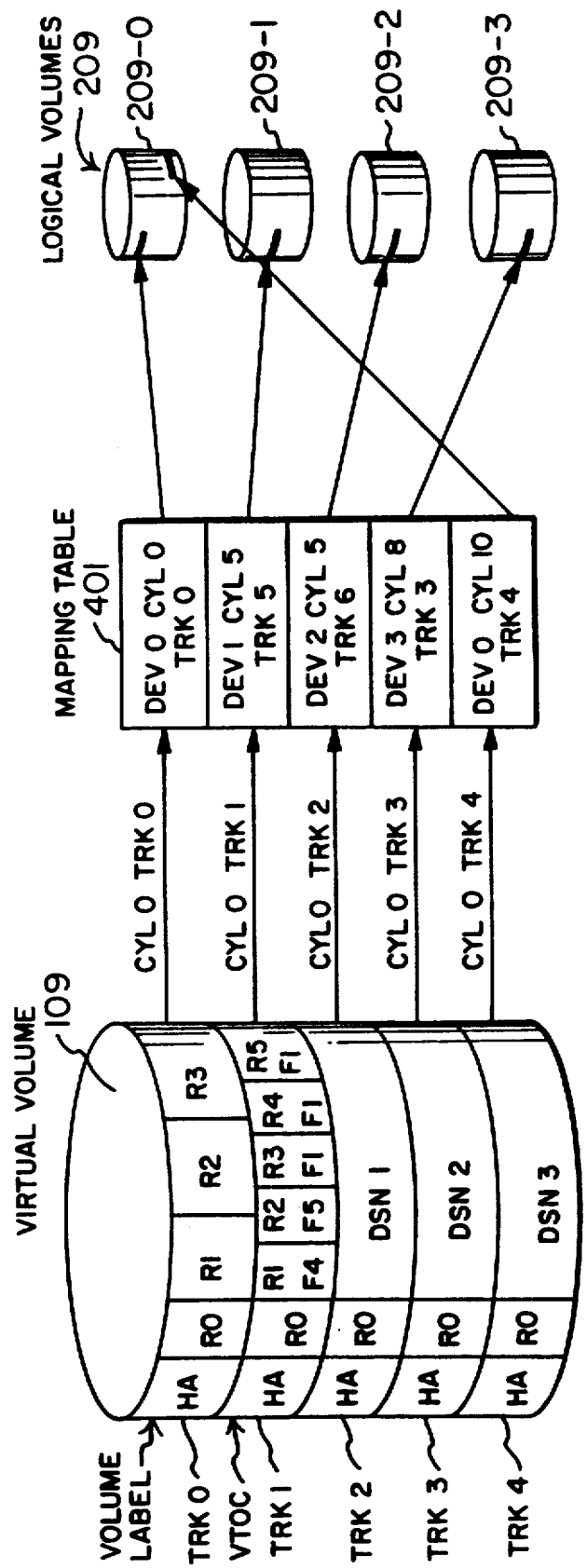
FIG. 6 discloses an image of a virtual volume having some of its tracks written with data files, the mapping table written with virtual/logical address correlation information and the logical volumes.

FIG. 6 is similar to FIG. 5 except that data files DSN2 and DSN3 have been written into virtual volume 109. Host processor 11 believes that virtual volume 109 now contains the volume label in track TRK0, the VTOC data file in track TRK1, data file DSN1 in track TRK2, and data files DSN2 and DSN3 in tracks TRK3 and TRK4. Control unit 101 responds to each command received from host processors 11, 12 for writing of virtual tracks TRK0 through TRK4 and writes the corresponding data files into logical volumes 209. The entries for mapping table 401 indicate where the virtual volume entries are stored in the logical volumes 209. The volume label information of virtual track TRK0 is in cylinder 0 track 0 of logical device 0. The VTOC dataset is in cylinder 5 track 5 of logical device 1. The DSN1 data file is in cylinder 8 track 3 of logical device 3 and the DSN3 data file is in cylinder 10 track 4 of logical device 0.

Mapping table 401 and logical volumes 209 enable the logical data storage subsystem of FIG. 6 to operate under control of host processor 11 and control unit 101 to respond to the virtual addresses generated by host processor 11 and read and write data files on logical volumes 209. Host processor 11 sends a channel command containing a virtual address parameter to control unit 101 requesting access to a specified data file. Control unit 101 receives each such command and applies the received virtual address for the requested data file to mapping table 401. Mapping table 401 responds with the corresponding logical address specifying the location on the logical volume 209 in which the requested data file is stored. Control unit 101 controls the accessing of the data file by using the logical volume address specified by mapping table 401.

The VTOC dataset of virtual volume 109 contains records R1 and R2 as well as format 1 records R3, R4, and R5. The logical VTOC contains the same information. These format 1 entries respectively pertain to data files DSN1, DSN2, and DSN3. In order for a data file to be read when its location is not known to host processor 11, the VTOC is first read to obtain the virtual address for the data file. Following this, the address information derived from the format 1 field of the VTOC is applied to the mapping table 401 to get the logical address of the data file. This logical address information is then used by control unit 101 to read or write the data file.

Host Processor Data File Deletion

The operating system resident on host processor 11, such as the IBM MVS operating system for example, includes a software component that maintains the volume table of contents for the associated data storage subsystem 100. In the MVS environment, this software component is called the direct access device space management (DADSM) program and responds to requests from other software components within the MVS operating system and from application programs to allocate and scratch data files (called datasets in the MVS environment) on the associated data storage subsystem 100. The allocate process reserves a predetermined amount of space on the data storage subsystem 100 to store a data file thereon. The data file consists of a sequence of extents, each of which corresponds to a plurality of sequentially addressed virtual tracks, each virtual track containing a plurality of data records. The scratch process deletes a previously stored data file from the data storage subsystem 100.

Figure 11:
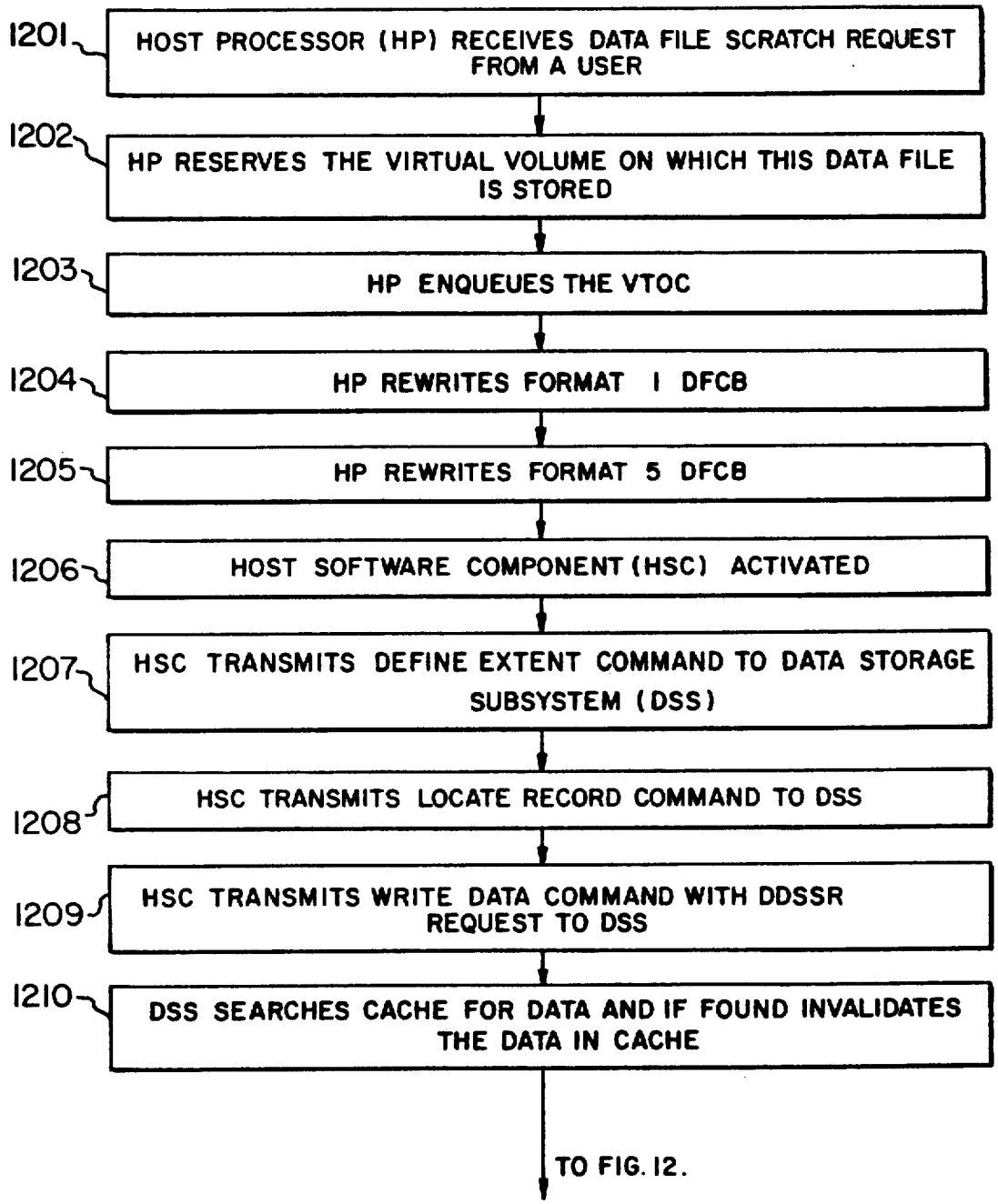
FIGS. 11, and 12 illustrate, in flow diagram form the operation of the deleted data file space release process.
Figure 12:
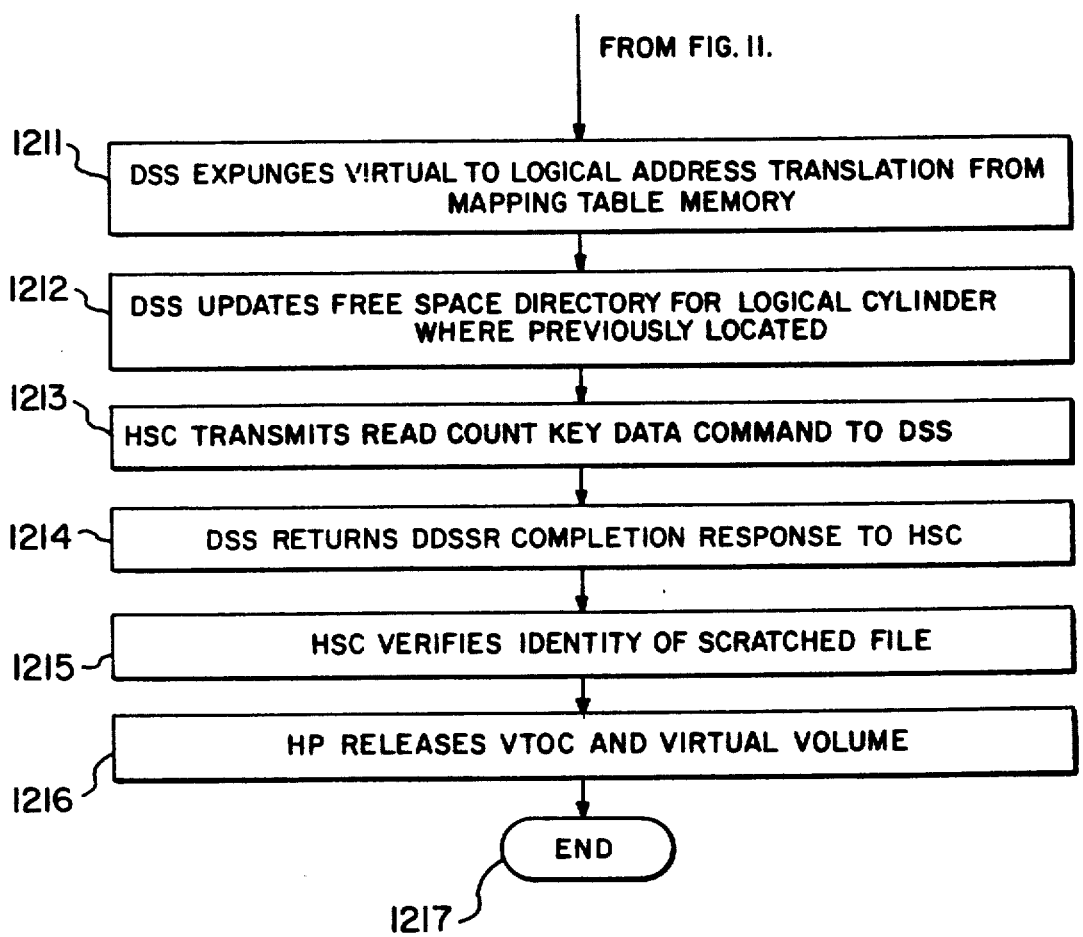

The flowchart of FIGS. 11 and 12 illustrate the steps taken in the data file space release process to release the space occupied by scratched data files in data storage subsystem 100. In operation, the DADSM software component, in response to a scratch request from an application program at step 1201, reserves the virtual volume on which the designated data file is stored at step 1202. The virtual volume is reserved by host processor 11 in order to protect against other host processors 12 attempting to access the selected data file on the data storage subsystem 100 while the first host processor 11 is attempting to scratch this data file. The host processor 11 then enqueues the volume table of contents at step 1203, which is a process that protects against other application programs or software components within the same host processor 11 from accessing the selected data file. The host processor 11 then rewrites the data file control block which defines the identified data file from a format 1 mode which indicates that data is contained therein to a format 0 mode which indicates an empty data file at step 1204. In addition, the host processor 11 rewrites the format 5 data file control block which defines unallocated space on the virtual volume at step 1205. By rewriting the format 5 data file control block, the host processor 11 adds this sequence of physical extents previously occupied by the scratched data file to the list of free space in the virtual volume. At this point, a host software component 11A, which is part of the data storage subsystem space release apparatus, is activated at step 1206. This host software component 11A consists of a standard user exit call, well known in the MVS software environment, which is implemented at the conclusion of the format 5 data file control block rewrite process. This host software component 11A transmits a channel program to the data storage subsystem 100 and, in response thereto, receive a response indicating that the selected data file has been deleted from the data storage subsystem 100. This message exchange is accomplished by using the existing subset of channel control words well known in the MVS environment. These channel control words include the "define extent", "locate record", "write data", and "read CKD" commands. Each of these channel command words consist of pointers that point to associated parameter lists or data stored in the memory of the host processor 11.

FIG. 13 illustrates the channel program commands and data exchanged between the host software component 11A on host processor 11 and data storage subsystem 100. At step 1207, host software component 11A transmits a Define Extent command 1301 which associated parameters 1311 include seek addresses (CCHH) xxxxxxxx and yyyyyyyy which define the extents (virtual DASD tracks) whose real storage is to be released. At step 1208, host software component 11A transmits a Locate Record command 1302 whose associated parameters 1312 represent a non-authorized command. This standard Locate Record command parameters are altered by host software component 11A to render them uniquely identifiable by data storage subsystem as a non-host processor message. In particular, there is an intentional contradiction created between bit 0 of byte 1 (auxiliary byte) and bytes 14, 15 (the transfer length factor). In addition, the search argument of bytes 8–11 is set to a predetermined pattern—C5C3C1D4. These two concurrent alterations in the Locate Record parameters alert data storage subsystem 100 of the host software component 11A source of these commands. In addition, byte 12 includes a function code (02) indicative of the operation requested by host software component 11A. A seek address zzzzzzzz is included in parameters 1312 at bytes 4–7, which seek address is within the extents defined in the Define Extents parameters 1311. At step 1209, host software component transmits a Write Data command 1303 whose associated parameters 1313 include no definitions. In response to these channel commands and parameters, data storage subsystem 100 at step 1210 searches cache 113 for the identified data and, if found, invalidates it in cache 113 to prevent subsequent access to it. Data storage subsystem 100 at step 1211 expunges the data file's virtual address to logical address translation information from mapping table memory 401. This operation renders the extend defined in the Define Extent parameters 1311 free space in data storage subsystem 100. Then, at step 1212 data storage subsystem 100 updates the Free Space Directory for the logical cylinder that previously contained the data. At step 1213, the host software component causes a Read Count Key and Data channel command 1304 to be transmitted to data storage subsystem 100, which replies at step 1214 with message 1314 which lists the data file extent deleted (beginning CCHH and ending CCHH) as well as the seek address from the Locate Record parameters 1312 transmitted by the host software component 11A. At step 1215 host software component 11A verifies the scratched data file space release by comparing the data returned by data storage subsystem in the Read Count Key Data parameters 1314 with the data originally transmitted by host software component. Host processor 11 at step 1216 releases the volume table of contents that was enqueued at step 1203 and the virtual volume that was reserved at step 1202. At step 1217, the process ends if a successful comparison is achieved and host processor 11 is released to continue operation.

Data Security Aspects of Deleted Dataset Space Release

Figure 7:
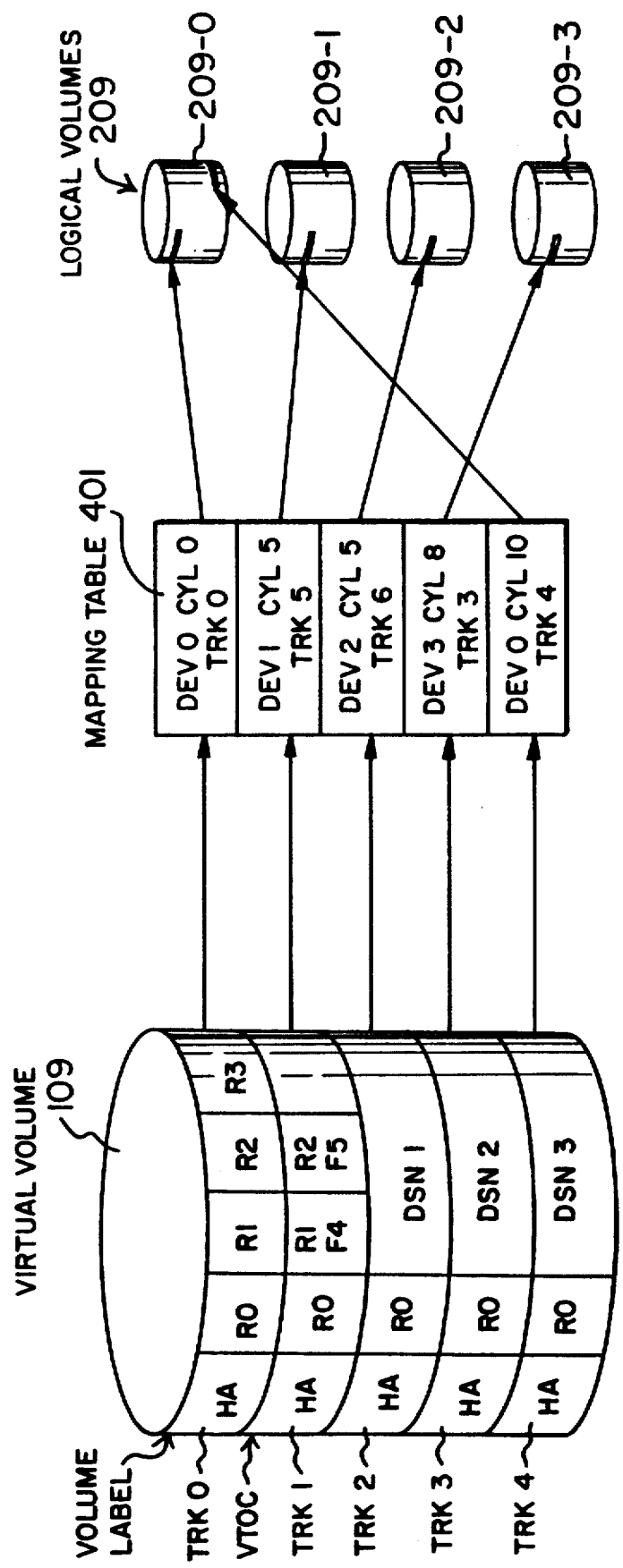
FIG. 7 illustrates an image of the virtual volume after all data file entries have been deleted from the VTOC, the mapping tables and the logical volumes without the present invention.

FIG. 7 shows an image of virtual volume 109, as well as the status of mapping table 401 and logical volumes 209 following an operation in which host processor 11 requests control unit 101 to scratch data files DSN1, DSN2, and DSN3. As can be seen on the left side of FIG. 7 for virtual volume 109, host processor 11 and control unit 101 have cooperated in this delete function by deleting the format 1 entries (R3, R4, and R5 of FIG. 6) in the VTOC dataset for each of data files DSN1, DSN2, DSN3. In accordance with usual procedures concerning the operation of DASD subsystems, control unit 101 does not cause the actual data for a deleted data file to be deleted from the areas of the logical volumes 109 containing the data file. Instead, only the related format 1 entry in the VTOC is deleted. This mode of operation for a data file delete function is normally adequate since when a subsequent request to read a deleted data file is applied to the VTOC, the VTOC returns no useful information to control unit 101 since the VTOC no longer contains the format 1 entry for the deleted data file such as DSN1. The same applies to data files DSN2 and DSN3 which are also shown on FIG. 7 as being deleted from the VTOC.

Under normal circumstances, the deletion of a VTOC format 1 entry for a deleted data file is sufficient for most users since when the VTOC is subsequently interrogated for access to the deleted data file, it returns no information and host processor 11 assumes that the data file no longer exists. However, on FIG. 7 it should be noted that even though the format 1 entry for a deleted data file has been erased from the VTOC, the actual data remains in the logical tracks of the logical volumes 209 and the logical address of the data file still remains in the mapping memory 401. This logical address specifies the whereabouts of the data in logical volumes 209.

The system of FIG. 7 precludes the accessing of deleted data files DSN1, DSN2 or DSN3 by commands that interrogate the VTOC since the format 1 VTOC entry for each of these data files has been deleted from the VTOC. However, host processor 11 can generate a command requesting the reading of the entire track of a volume. Thus, control unit 101 may receive a channel command from host processor 11 requesting reading of the entirety of track 2 of virtual volume 109. Control unit 101 responds to this command and applies the track 2 virtual address to mapping memory 401 which indicates that virtual volume track 2 corresponds to cylinder 5 track 6 of logical volume 209-2. Using this information, control unit 101 sends the appropriate commands to the controlling circuitry for logical volumes 209 to cause track 6 of cylinder 5 of logical device 2 to be read and returned to host processor 11. By this means a user can obtain access to a data file whose format 1 entry has been removed from the VTOC. This situation is undesirable in situations where the deleted data files contain sensitive information such as payroll information or other proprietary information that must be accorded a higher degree of security.

Figure 8:
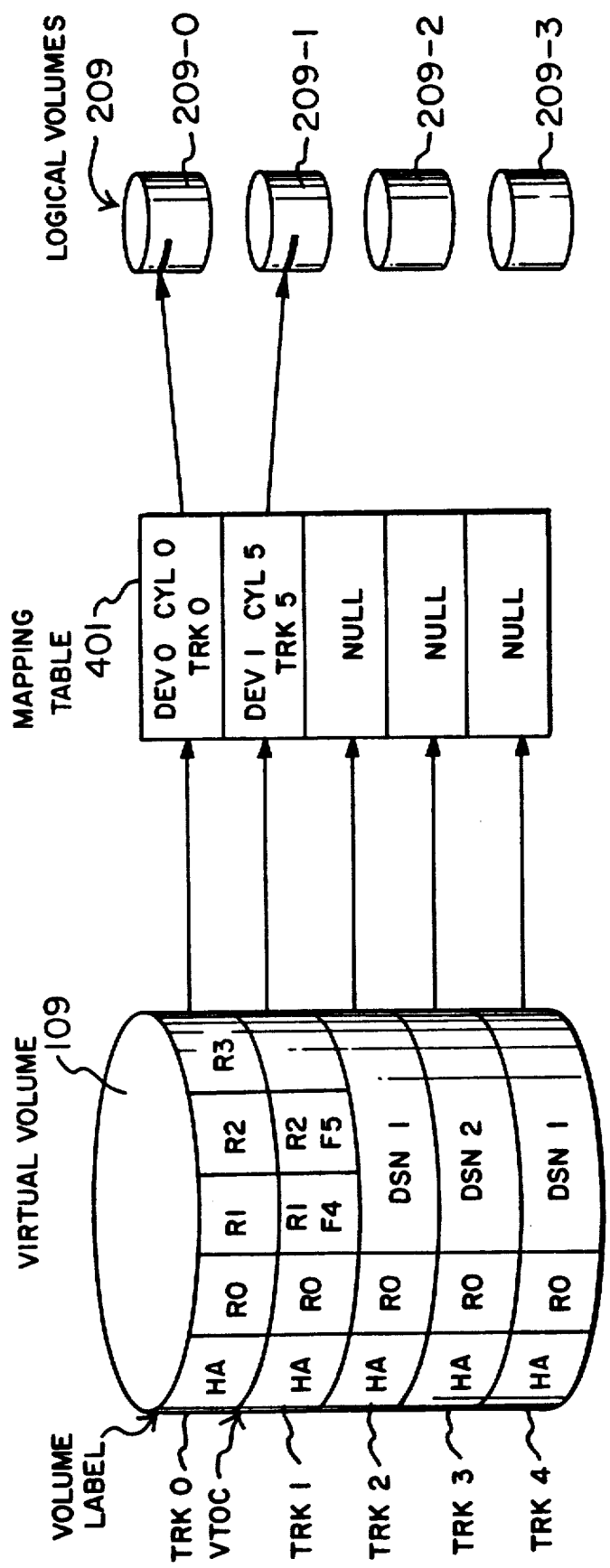
FIG. 8 illustrates an image of the virtual volume after all the data files have been deleted, the mapping tables and the logical volumes with the invention.

FIG. 8 discloses the operation of the system in accordance with the present invention following an operation in which host processor 11 has requested that data files DSN1, DSN2 and DSN3 be deleted. As described in connection with FIG. 8, the format 1 entry for these three data files is erased from the VTOC by the delete command so that a subsequent attempt by host processor 11 to access the deleted data file via it's format 1 VTOC entry returns no data.

In accordance with the invention, control unit 101 operates in response to a data file delete operation on FIG. 8 to erase from the mapping table 401 all address information correlating the virtual and logical addresses of deleted data files. This is shown in the bottom three locations of mapping table 401 which now contain null information. With this situation, the reception by control unit 101 of a command specifying the reading of virtual tracks TRK2, TRK3 or TRK4 returns no useful information to the user since, in response to the receipt of such commands, mapping table 401 returns no information to control unit 101 indicating the logical address of the deleted data files. This prevents access to deleted data files which data still remains on logical volumes 209. In other words, even though the data whose security must be protected remains on the logical volumes, it cannot be accessed by a computer command that requests the reading of specified tracks of the virtual volume.

While a specific embodiment of this invention has been disclosed, it is expected that those skilled in the art can and will design alternate embodiments of this invention that fall within the scope of the appended claims.

We claim:

1. A dynamically mapped virtual memory data storage subsystem, that includes a plurality of data storage devices and that is connected to at least one host processor for storing data files for access by said host processor using a virtual address assigned by said host processor to each said data file and that deletes data files from said data storage devices independent of said host processor, wherein said host processor transmits predefined commands, each of which includes a set of parameters, to said data storage subsystem to activate said data storage subsystem to read and write data files on said data storage devices, comprising:

means, responsive to said host processor transmitting a data file to said data storage subsystem for storage therein, for mapping a virtual address assigned by said host processor to said transmitted data file into an address which defines a physical memory location on one of said data storage devices;

means for writing said transmitted data file to said defined physical memory location on said data storage device;

means for storing data, including said address, indicative of said virtual address to physical memory location mapping for each of said data files stored on said data storage devices;

means, in said host processor, responsive to said host processor generating controls signals to scratch one of said data files, for transmitting commands to said data storage subsystem, independent of said host processor, identifying said scratched data file, comprising:

means for generating one of said predefined commands, independent of said host processor;

means for altering at least one of said set of predefined parameters in said one generated predefined command to indicate to said data storage subsystem that said one command containing said altered parameters originates from said transmitting means rather than said host processor;

means for forwarding said altered command to said data storage system; and means, responsive to said scratched data file identifying commands, for expunging said data indicative of said virtual address to said physical memory location mapping from said storing means for said identified scratched data file.

2. The apparatus of claim 1 wherein said transmitting means further includes:
means for inserting the virtual address, assigned by said host processor to said scratched data file, into said one generated predefined command.

3. The apparatus of claim 2 wherein said data storage subsystem transmits predefined response commands, each of which includes a set of parameters, to said host processor to indicate the completion of reading and writing of data files in said data storage subsystem, said expunging means includes:
means for generating one of said predefined response commands;
means for inserting said virtual address, assigned by said host processor to said scratched file into said one generated response commands to indicate to said transmitting means that said altered parameters originate from said data storage subsystem; and
means for forwarding said command to said transmitting means, located in said host processor.

4. The apparatus of claim 1 wherein said expunging means includes:
means for inserting a null address into said storing means in place of said data in said storing means indicative of said virtual address to physical memory location mapping for said identified scratched data file.

5. The apparatus of claim 1, wherein said data storage subsystem includes a cache memory for storing data in transit between said data storage devices and said host processor, said data storage subsystem further comprises:
means, responsive to said scratched data file identifying command, for deleting said scratched data file from said cache memory if present therein.

6. In a dynamically mapped virtual memory data storage subsystem that includes a plurality of data storage devices and that is connected to at least one host processor for storing data files for access by said host processor using a virtual address assigned by said host processor to each said data file, wherein said host processor transmits predefined commands, each of which includes a set of parameters, to said data storage subsystem to activate said data storage subsystem to read and write data files on said data storage devices, a method operationally independent of said host processor for deleting data files from said data storage devices comprising the steps of:
mapping, in response to said host processor transmitting a data file to said data storage subsystem for storage therein, a virtual address assigned by said host processor to said transmitted data file into an address which defines a physical memory location on one of said data storage devices;
writing said transmitted data file to said defined physical memory location on said one data storage device;
storing data, including said address, in a mapping memory indicative of said virtual address to physical memory location mapping for each of said data files stored on said data storage devices;
transmitting from said host computer, in response to said host processor generating control signals to scratch one of said data files, a scratched file identifying command to said data storage subsystem independent of said host computer, identifying said scratched data file, comprising:
generating one of said predefined commands, independent of said host processor,
altering at least one of said set of parameters in said one generated predefined command to indicate to said data storage subsystem that said one command containing said altered parameters is a data file scratched message generated exclusive of said host processor,
inserting the virtual address, assigned by said host processor to said scratched data file, into said one generated predefined command,
forwarding said altered command to said storage system; and
expunging from said mapping memory, in response to said received scratched data file identifying command, said data indicative of said virtual address to physical memory location mapping for said identified scratched data file.

7. The method of claim 6 wherein said host processor transmits predefined commands, each of which includes a set of parameters, to said data storage subsystem to activate said data storage subsystem to read and write data files on said data storage devices, said step of transmitting includes:
generating one of said predefined commands, independent of said host processor;
altering at least one of said parameters in said one generated predefined command to indicate to said data storage subsystem that said one command containing said altered parameters is a data file scratched message generated exclusive of said host processor;
inserting the virtual address, assigned by said host processor to said scratched data file, into said one generated predefined command;
forwarding said altered command to said data storage system.

8. The method of claim 6 wherein said step of expunging includes:
inserting a null address into said mapping memory in place of said data indicative of said virtual address to physical memory location mapping for said identified scratched data file.

9. The method of claim 6, wherein said data storage subsystem includes a cache memory for storing data in transit between said data storage devices and said host processor, further including:
deleting, in response to said scratched data file identifying command, said scratched data file from said cache memory if present therein.

10. A dynamically mapped virtual memory data storage subsystem that includes a plurality of disk drives, a subset of said plurality of disk drives being assigned into at least two redundancy groups, each redundancy group consisting of at least two disk drives, and which data storage subsystem is connected to at least one host processor for storing data files for access by said host processor using a virtual address assigned by said host processor to each said data file, and which data storage subsystem deletes data files from said redundancy groups independent of said host processor comprising:
means, responsive to the receipt of a data file from said host processor for selecting one of said redundancy groups to store said received data file thereon;

means for mapping a virtual address, assigned by said host processor to said received data file, into an address which defines a physical memory location on said disk drives in said selected redundancy group;

means for writing said received data file and redundancy data associated with said received data file to said defined physical memory location in said selected redundancy group;

mean for storing data indicative of said virtual address to physical memory location mapping for each of said data files stored on said redundancy groups;

means in said host processor, responsive to said host processor generating control signals to scratch one of said data files, for transmitting commands to said data storage subsystem independent of said host processor identifying said scratched data file;

means, responsive to said scratched data file identifying commands, for expunging said data indicative of said virtual address to physical memory location mapping from said storing means for said identified scratched data file.

11. In a dynamically mapped virtual memory data storage subsystem that includes a plurality of disk drives, a subset of said plurality of disk drives being assigned into at least two redundancy groups, each redundancy group consisting of at least two disk drives, and which data storage subsystem is connected to at least one host processor for storing data files for access by said host processor to each said data file, a method operationally independent of said host processor of deleting data files from said redundancy groups comprising the steps of:

selecting, in response to the receipt of a data file from said host processor, one of said redundancy groups to store said received data file thereon;

mapping a virtual address assigned by said host processor to said received data file into an address which defines a physical memory location on said disk drives in said selected redundancy group;

writing said received data file and redundancy data associated with said received data file to said defined physical memory location in said selected redundancy group;

storing data in a mapping memory indicative of said virtual address to physical memory location mapping for each of said data files stored on said redundancy groups;

transmitting to said data storage subsystem from said host processor, in response to said host processor generating control signals to scratch one of said data files, a scratched data file identifying command independent of said host processor to identify said scratched data file;

expunging, in response to said scratched data file identifying command, said data indicative of said virtual address to physical memory location mapping from said mapping memory for said identified scratched data file.

12. A dynamically mapped virtual memory data storage subsystem that includes a plurality of disk drives, a subset of said plurality of disk drives being assigned into at least two redundancy groups, each redundancy group containing n+m disk drives, where n is a positive integer greater than 1 and m is a positive integer equal to or greater than 1, and which data storage subsystem is connected to at least one host processor for storing data files for access by said host processor using a virtual address assigned by said host processor to each said data file, and which data storage subsystem deletes data files form said redundancy groups independent of said host processor, comprising:

means for transferring data between said data storage subsystem and said host processor;

means responsive to the receipt of a data file from said host processor for selecting one of said redundancy groups to store said received data file thereon;

means for mapping a virtual address assigned by said host processor to said received data file into an address which defines a physical memory location on said disk drives in said selected redundancy group;

means for generating data redundancy information for said received data file;

means for writing said received data file plus said redundancy data on to said n+m disk drives of said selected redundancy group;

means for storing data indicative of said virtual address to physical memory location mapping for each of said data files stored on said redundancy groups;

means, in said host processor, responsive to said host processor generating control signals to scratch one of said data files, for transmitting a command to said data storage subsystem, independent of said host processor, identifying said scratched data file; and means, responsive to said scratched data file identifying command, for expunging said data indicative of said virtual address to physical memory location mapping from said storing means for said identified scratched data file.

13. The apparatus of claim 12 wherein said transmits predefined commands, each of which a set of parameters, to said data storage subsystem to active said data storage subsystem to read and write data files in said redundancy groups, said transmitting means includes:

means for generating one of said predefined commands, independent of said host processor;

means for altering at least one of said parameters in said scratched data file identifying commands to indicate to said data storage subsystem that said scratched data file identifying command containing said altered parameters originates from said transmitting means rather than said host processor;

means for forwarding said altered command to said data storage subsystem.

14. The apparatus of claim 13 wherein said transmitting means further includes:

means for inserting the virtual address, assigned by said host processor to said scratched data file, into said one generated predefined command.

15. The apparatus of claim 14 wherein said data storage subsystem transmits predefined response commands, each of which includes a set of parameters, to said host processor to indicate the completion of reading and writing of data files in said data storage subsystem said expunging means includes:

means for generating one of said predefined response commands;

means for inserting said virtual address, assigned by said host processor to said scratched data file into said one generated response command to indicate to said transmitting means that said one command containing said altered parameters originates from said data storage subsystem; and means for forwarding said command to said transmitting means, located in said host computer.

16. The apparatus of claim 12 wherein said expunging means includes:

means for inserting a null address into said storing means in place of said data in said storing means indicative of said virtual address to physical memory location mapping for said identified scratched data file.

17. The apparatus of claim 12, wherein said data storage subsystem includes a cache memory for storing data in transit between said redundancy groups and said host processor, said data storage subsystem further comprises:

means, responsive to said scratched data file identifying command, for deleting said scratched data file from said cache memory if present therein.

18. In a dynamically mapped virtual memory data storage subsystem that includes a plurality of disk drives, a subset of said plurality of disk drives being assigned into at least two redundancy groups, each redundancy group containing n+m disk drives, where n is a positive integer greater than 1 and m is a positive integer equal to or greater than 1, and which data storage subsystem is connected to at least one host processor for storing data files for access by said host processor using a virtual address assigned by said host processor to each said data file, a method operationally independent of said host processor of deleting data files from aid redundancy groups comprising the steps of:

transferring data between said data storage subsystem and said host processor;

selecting in response to the receipt of a data file from said host processor, one of said redundancy groups to store said received data file thereon;

mapping a virtual address assigned by said host processor to said received data file into an address which defines a physical memory location on said disk drives in said selected redundancy group;

generating data redundancy information for said received data file;

writing said received data file plus said redundancy data on to said n+m disk drives of said selected redundancy group;

storing in a mapping memory data indicative of said virtual address to physical memory location mapping for each of said data file stored on said redundancy groups;

transmitting from said host processor, in response to said host processor generating control signals to scratch one of said data files, a command to said data storage subsystem, independent of said host processor, identifying said scratched data file; and expunging, in response to said scratched data file identifying command, said data indicative of said virtual address to physical memory location mapping form said storing means for said identified scratched data file.

19. The method of claim 18 wherein said host processor transmits predefined commands, each of which includes a set of parameters, to said data storage subsystem to activate said data storage subsystem to read and write data files in said redundancy groups, said step of transmitting includes:

generating one of said predefined commands, independent of said host processor;

altering one of said predefined parameters to indicate to said data storage subsystem that said command containing said altered parameter is indicative of a scratched data file;

forwarding said altered command to said data storage subsystem.

* * * * *